US005954351A

United States Patent [19]

Koschinat

[11] Patent Number: 5,954,351

[45] Date of Patent: Sep. 21, 1999

[54] VEHICLE SUSPENSION SYSTEM AND ASSEMBLY AND MOUNTING PLATE THEREFOR

[75] Inventor: Hubert Koschinat, Hoesbach, Germany

[73] Assignee: Otto Sauer Achsenfabrik Keilberg, Bessenbach-Keilberg, Germany

[21] Appl. No.: 08/934,138

[22] Filed: Sep. 19, 1997

[30] Foreign Application Priority Data

Sep. 19, 1996 [DE] Germany ........................ 296 16 257 U

[51] Int. Cl.[6] ........................ B60G 11/28

[52] U.S. Cl. ........................ 280/124.116; 280/124.128; 280/124.158

[58] Field of Search ........................ 280/124.116, 124.128, 280/124.158

[56] References Cited

U.S. PATENT DOCUMENTS

| | | | |
|---|---|---|---|
| 4,162,090 | 7/1979 | Schwartz | 280/124.116 |
| 4,415,179 | 11/1983 | Marinelli | 280/124.116 |
| 5,037,126 | 8/1991 | Gottschalk et al. | 280/124.116 |
| 5,375,871 | 12/1994 | Mitchell et al. | 280/124.116 |
| 5,536,036 | 7/1996 | Ehrlich | 280/124.128 |

OTHER PUBLICATIONS

BPW–0–9/89 d, Published 1989 (2 pages).

BPW–EL–SL–95/1d[6002], Published 1995 (3 pages).

*Primary Examiner*—Kenneth R. Rice
*Attorney, Agent, or Firm*—Wenderoth, Lind & Ponack, L.L.P.

[57] ABSTRACT

A vehicle suspension system includes an axle body to extend transversely of a vehicle. Improved radius arms are fixed to the axle body at respective opposite sides of a longitudinal center plane of the vehicle. Each radius arm has a forward arm portion extending forwardly from the axle body and having a front end to be mounted to pivot about a pivot axis to be stationary on a chassis of the vehicle. Each radius arm has a rearward arm portion extending rearwardly from the axle body and including a support portion to support an air spring to be braced upwardly against the chassis of the vehicle. The support portion of each radius arm has a mounting structure to enable the air spring to be mounted to the support portion at a position that is variable relative thereto. Such mounting structure may include a plurality of holes spaced in the width and length directions of the support portion.

47 Claims, 2 Drawing Sheets

VEHICLE SUSPENSION SYSTEM AND ASSEMBLY AND MOUNTING PLATE THEREFOR

BACKGROUND OF THE INVENTION

The present invention relates to a vehicle suspension system with air spring mounting. The present invention particularly relates to such a system including a rigid axle body to extend transversely of a vehicle, and at least one radius arm or suspension arm fixed to the rigid axle body, for example by welding or bracing, on each of opposite sides of a longitudinal center plane of the vehicle. Each radius arm includes a front end that is articulated or mounted to pivot about a bearing point or pivot axis that is to be stationary on the vehicle and spaced therefrom. Each radius arm includes a rear end portion extending rearwardly from the axle body and defining a support shank or portion forming a lower bearing for an air spring an upper end of which is to be braced against the vehicle chassis. The present invention also is directed to such a system including respective air springs mounted on the support portions of the radius arms. The present invention also is directed to an assembly for use in such suspension system, the assembly including an improved radius arm, and additionally including an air spring mounted thereon. The present invention even further is directed to an improved mounting plate for mounting an air spring to a support portion of such radius arm.

In known suspensions of the above type, an air spring is connected with a radius arm in a fixedly and unchangeable position. For example, a casing of the air spring is welded to the radius arm. A disadvantage of such known system is that, since the air springs are used in only a single fixed position, an unsatisfactory spring function or performance may occur due to the widely diverse types of springs available on the market.

SUMMARY OF THE INVENTION

Accordingly, it is an object of the present invention to provide an improved vehicle suspension system of the above type, but in which air springs of different manufacturers with varying connection means can be employed.

It is a further object of the present invention to provide such system wherein it is possible to position the air springs as far to the outside as possible without colliding with wheels/tires of the vehicle, and also to obtain the optimum spacing from the bearing points or pivot axes of the radius arms.

It thus is a further object of the present invention to provide a vehicle suspension system of the above type, but wherein it is possible to overcome the above and other prior art disadvantages.

It is an even further object of the present invention to provide an assembly of an improved radius arm to be employed in such vehicle suspension system.

It is a yet further object of the present invention to provide an improved mounting plate employable for mounting an air spring to such radius arm.

The above objects are achieved in accordance with the present invention by provision that an air spring is mountable in a plurality of positions that are variable relative to the support shank or support portion of the radius arm. This permits positioning of different connection measures of air springs of different manufacturers and different types at optimum positions on the support shank or portion of a particular radius arm. This also permits subsequent exchange of an air spring of one type for an air spring of another type, for example having a different connection arrangement or measure. The position of an air spring, at least with respect to spacing thereof from the stationary bearing point or pivot axis to the vehicle chassis, preferably is variable so that the air spring may be positioned on the support shank or portion of the radius arm to achieve an optimum spacing from the bearing point or pivot axis of the radius arm. Additionally, it is possible that the position of the air spring on the support shank or portion of the radius arm is variable relative to the longitudinal center plane of the vehicle, thereby to provide that an air spring of any particular type can be positioned as far as possible to the outside of the vehicle without colliding with the wheel/tire of the vehicle.

The support shank or portion of the radius arm may be provided to establish an approximately horizontal bearing plate for the air spring, with plural holes being provided in the bearing plate for the detachable connection of the air spring. The plural holes may be distributed over the length and/or width of the bearing plate. In this manner, the air spring can be attached to the bearing plate so as to be detachable at will by use of simple mounting bolts passing through a selected of the holes. The support shank or portion of the radius arm, at least in the region of the bearing plate, may be in the form of a U-shaped cross sectional configuration that is open downwardly and that is defined by side flanges bent downwardly at an angle relative to the upwardly located bearing plate. As a result, the bearing plate is provided with satisfactory stiffened qualities.

In accordance with a further feature of the present invention, the air spring may be in the form of a conventional plunger and casing, the plunger being mounted by means of a mounting plate on the bearing plate of the radius arm so as to be selectively detachable therefrom. This permits simple and secure mounting of a particular air spring. The mounting plate can include a center opening receiving a mounting bolt extending through a selected one of the holes of the bearing plate. To ensure adequate stability, the center opening can be provided in a central projection of the mounting plate, and the projection may be adjoined by stiffening webs extending generally radially outwardly from the projection. The mounting of the air spring further can be simplified by providing that the center opening of the mounting plate has inner threads to mesh with threads of the mounting bolt. The mounting plate may have distributed around the region of an outer periphery thereof circumferentially spaced openings for receipt of connection bolts to connect the mounting plate to the plunger of the air spring. The mounting plate can be formed of a light metal or a synthetic material, for example synthetic resin material, to ensure reduced weight.

BRIEF DESCRIPTION OF THE DRAWINGS

Other objects, features and advantages of the present invention will be apparent from the following description of preferred exemplary features, with regard to the accompanying drawings, wherein.

DETAILED DESCRIPTION OF THE INVENTION

Figures 1A, 1B:
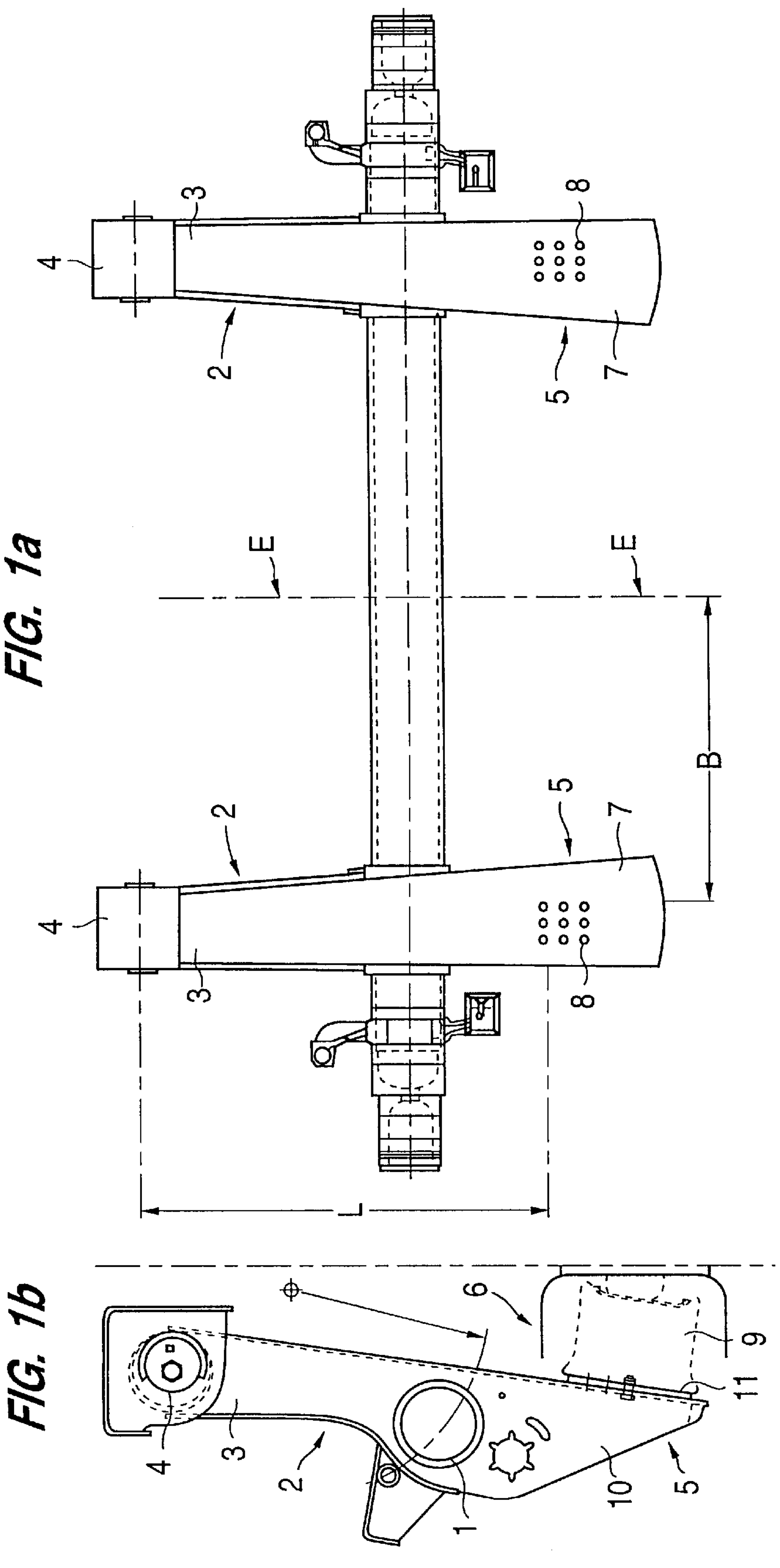
FIG. 1*a* is a top view schematically illustrating a vehicle suspension system according to the present invention.
FIG. 1*b* is a side view thereof, also illustrating schematically connection to an air spring.

FIGS. 1*a* and 1*b* illustrate a vehicle suspension system and assembly therefor in accordance with the present invention. The suspension system includes a rigid axle body 1, for example in the form of an axle tube. Fixed to axle body 1, on respective opposite sides of a longitudinal center plane E of the vehicle, are suspension arms or radius arms 2. Each arm 2 has a forward end portion extending forwardly from axle body 1 and having a front end 3 that is articulated or mounted to pivot about a bearing point or pivot axis 4 that is stationary to the vehicle chassis. Each radius arm 2 is fixedly connected to axle body 1 at a point rearwardly of bearing point 4. In the illustrated arrangement, axle body 1 is in the form of an axle tube extending through side flanges 10 bent downwardly at an angle from radius arm 2, thus defining radius arm 2 to have a substantially U-shaped cross sectional configuration. Axle body 1 is welded at flanges 10. However, it also is possible that the axle body 1 may be braced to radius arms 2, for example by known U-shaped shackles. Each radius arm 2 includes a rearward arm portion extending rearwardly from axle body 1 and including a support shank or portion 5 which forms a support or bearing for an air spring 6 (FIG. 1*b*) that is intended to be braced upwardly against the chassis of the vehicle.

In accordance with the present invention, the support shank or portion 5 is intended to be in the form of a substantially horizontal bearing plate 7 for support of the air spring. Bearing plate 7 is provided with a plurality of holes 8 to enable the selective detachable connection of the air spring 6, and to enable the air spring 6 to be connected at selected different positions relative to bearing plate 7. FIG. 1*a* shows a preferred arrangement of a configuration of nine holes 8 that are distributed over the length and width dimensions of bearing plate 7. In this manner, the position of air spring 6 can be changed with respect to spacing L thereof from bearing point 4. It is also possible to change the position of air spring 6 with respect to spacing B thereof from the longitudinal center plane E of the vehicle. By this arrangement, any type of air spring can be mounted at an optimum spacing from bearing point 4 and with as small as possible a spacing from the vehicle wheel/tire. The support shank or portion 5, particularly in the region of bearing plate 7, is provided with the above discussed U-shaped cross sectional configuration that is open in a downward direction, and defined by side flanges 10 angled downwardly relative to the upwardly positioned bearing plate 7. This relationship particularly is shown in FIG. 2*a*.

Figure 2A:
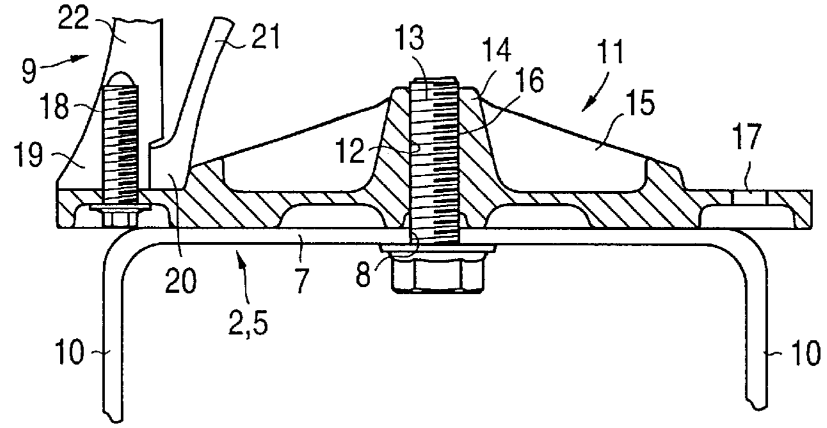
FIG. 2*a* is a cross-sectional view taken along line 2*a*—2*a* of FIG. 2*b* and illustrating a mounting plate according to the invention, shown fixed to a support portion of a radius arm according to the invention and fixed to a plunger of the air spring.
Figure 2C:
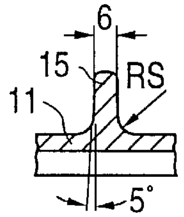
FIG. 2*c* is a partial sectional view taken along line 2*c*—2*c* of FIG. 2*b*.
Figure 2B:
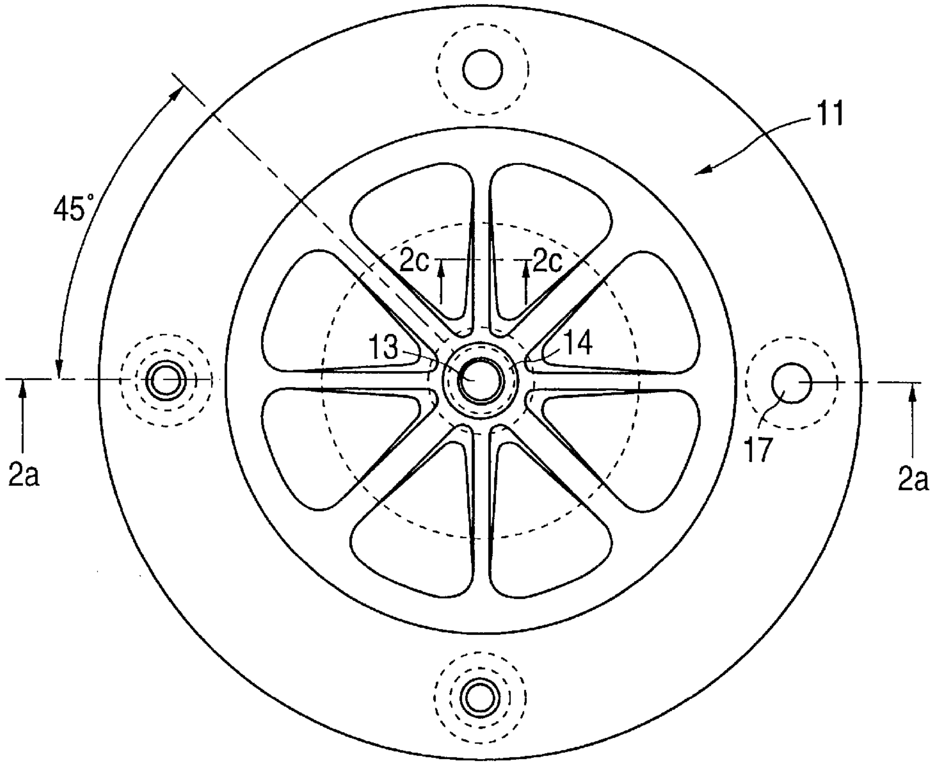
FIG. 2*b* is a plan view of the mounting plate.

FIG. 2*a* schematically illustrates an air spring 6 including, in a known manner, a plunger 9 for an air spring casing. Plunger 9 is detachably mounted by means of a mounting plate 11 in accordance with the present invention on bearing plate 7 of radius arm 2. This is achieved by means of a mounting bolt 13 which extends through a selected one of the holes 8 in bearing plate 7. For this purpose, mounting plate 11 has a center opening 12 for receipt of mounting bolt 13. Center opening 12 preferably has inner threads 16 meshing with exterior threads of threaded bolt 13. Center opening 12 and inner threads 16 thereof are provided in a projection 14 that extends prominently from a side of mounting plate 11 facing away from bearing plate 7. Stiffening of mounting plate 11 is achieved by generally radially extending reinforcement webs 15 extending radially outwardly from projection 14. Mounting plate 11 has in the area of an outer periphery thereof a plurality of circumferentially spaced through-openings 17 for receipt of connection bolts 18 engaging the lower edge of plunger 9 of air spring 6. Bolts 18 extend through openings 17 and engage, as shown in FIG. 2*a*, lower edge 19 of plunger skirt 22, or can engage a lower edge 20 of a support cone 21 of plunger 9. To reduce weight, mounting plate 11 can be formed of light metal or synthetic material.

The vehicle suspension system of the present invention includes the axle body 1 and the suspension of radius arms 2 as discussed above, and additionally includes the air springs 6. The invention also is directed to an assembly of the improved radius arm, also possibly including a respective air spring 6. The present invention also is directed to the improved mounting plate 11. These features of the present invention have been described and illustrated with regard to preferred features. However, it is to be understood that such specifically described and illustrated features may be modified as would be understood by one of ordinary skill in the art. It is intended that such modifications be encompassed within the scope and construction of the accompanying claims, unless specifically excluded.

I claim:

1. A vehicle suspension system comprising:

an axle body to extend transversely of a vehicle;

two radius arms fixed to said axle body at positions spaced axially thereof to be located on opposite respective sides of a longitudinal center plane of the vehicle;

each said radius arm having a forward arm portion extending forwardly from said axle body and having a front end to be mounted to pivot about a pivot axis to be stationary on a chassis of the vehicle and a rearward arm portion extending rearwardly from said axle body and including a support portion to support an air spring to be braced upwardly against the chassis of the vehicle; and said support portion having mounting structure to enable the air spring to be mounted to said support portion at a position that is variable relative thereto.

2. A vehicle suspension system as claimed in claim 1, wherein said position is variable relative to spacing thereof from the respective said pivot axis.

3. A vehicle suspension system as claimed in claim 2, wherein said position is variable in a direction axially of said axle body.

4. A vehicle suspension system as claimed in claim 1, wherein said position is variable in a direction axially of said axle body.

5. A vehicle suspension system as claimed in claim 1, wherein said support portion comprises a bearing plate, and said mounting structure includes plural holes formed in said bearing plate.

6. A vehicle suspension system as claimed in claim 5, wherein said holes are spaced in a lengthwise direction of said bearing plate.

7. A vehicle suspension system as claimed in claim 6, wherein said holes are spaced in a widthwise direction of said bearing plate.

8. A vehicle suspension system as claimed in claim 5, wherein said holes are spaced in a widthwise direction of said bearing plate.

9. A vehicle suspension system as claimed in claim 5, wherein said radius arm has, at least in the region of said bearing plate thereof, a downwardly open U-shaped transverse cross-sectional configuration defined by side flanges angled downwardly from said bearing plate.

10. A vehicle suspension system as claimed in claim 1, wherein said radius arm has, at least in the region of said support portion thereof, a downwardly open U-shaped cross-sectional configuration defined by side flanges angled downwardly from said support portion.

11. A vehicle suspension system as claimed in claim 1, further comprising two air springs, each including a lower portion supported on said support portion of a respective said radius arm and an upper portion to be braced against the chassis of the vehicle.

12. A vehicle suspension system as claimed in claim 11, wherein each said air spring includes a plunger, and further comprising a mounting plate detachably mounting said plunger to the respective said support portion.

13. A vehicle suspension system as claimed in claim 12, wherein said mounting plate has a center opening receiving a bolt extending from said support portion.

14. A vehicle suspension system as claimed in claim 13, wherein said bolt extends through one of a plurality of holes formed at spaced locations in said support portion.

15. A vehicle suspension system as claimed in claim 14, wherein said locations are spaced in widthwise and lengthwise directions of said support portion.

16. A vehicle suspension system as claimed in claim 13, wherein said center opening is formed in a central projection of said mounting plate.

17. A vehicle suspension system as claimed in claim 16, wherein said mounting plate includes stiffening webs extending radially from said central projection.

18. A vehicle suspension system as claimed in claim 13, wherein said center opening has inner threads meshing with threads of said bolt.

19. A vehicle suspension system as claimed in claim 12, wherein said mounting plate has therethrough circumferentially spaced openings receiving bolts connecting said mounting plate to said plunger.

20. A vehicle suspension system as claimed in claim 12, wherein said mounting plate is formed of light metal or synthetic material.

21. An assembly to be used as part of a vehicle suspension system, said assembly comprising:

- a radius arm to be fixed to an end of an axle body that is to extend transversely of a vehicle;
- said radius arm having a forward arm portion that is to extend forwardly from the axle body and having a front end to be mounted to pivot about a pivot axis to be stationary on a chassis of the vehicle;
- said radius arm having a rearward arm portion that is to extend rearwardly from the axle body and including a support portion to support an air spring to be braced upwardly against the chassis of the vehicle; and
- said support portion having mounting structure to enable the air spring to be mounted to said support portion at a position that is variable relative thereto.

22. An assembly as claimed in claim 21, wherein said position is variable relative to spacing thereof from the respective pivot axis.

23. An assembly as claimed in claim 22, wherein said position is variable in a direction transversely of said radius arm.

24. An assembly as claimed in claim 21, wherein said position is variable in a direction transversely of said radius arm.

25. An assembly as claimed in claim 21, wherein said support portion comprises a bearing plate, and said mounting structure includes plural holes formed in said bearing plate.

26. An assembly as claimed in claim 25, wherein said holes are spaced in a lengthwise direction of said bearing plate.

27. An assembly as claimed in claim 26, wherein said holes are spaced in a widthwise direction of said bearing plate.

28. An assembly as claimed in claim 25, wherein said holes are spaced in a widthwise direction of said bearing plate.

29. An assembly as claimed in claim 25, wherein said radius arm has, at least in the region of said bearing plate thereof, a downwardly open U-shaped transverse cross-sectional configuration defined by side flanges angled downwardly from said bearing plate.

30. An assembly as claimed in claim 21, wherein said radius arm has, at least in the region of said support portion thereof, a downwardly open U-shaped cross-sectional configuration defined by side flanges angled downwardly from said support portion.

31. An assembly as claimed in claim 21, further comprising an air spring including a lower portion supported on said support portion of a respective said radius arm and an upper portion to be braced against the chassis of the vehicle.

32. An assembly as claimed in claim 31, wherein said air spring includes a plunger, and further comprising a mounting plate detachably mounting said plunger to said support portion.

33. An assembly as claimed in claim 32, wherein said mounting plate has a center opening receiving a bolt extending from said support portion.

34. An assembly as claimed in claim 33, wherein said bolt extends through one of a plurality of holes formed at spaced locations in said support portion.

35. An assembly as claimed in claim 34, wherein said locations are spaced in widthwise and lengthwise directions of said support portion.

36. An assembly as claimed in claim 33, wherein said center opening is formed in a central projection of said mounting plate.

37. An assembly as claimed in claim 36, wherein said mounting plate includes stiffening webs extending radially from said central projection.

38. An assembly as claimed in claim 33, wherein said center opening has inner threads meshing with threads of said bolt.

39. An assembly as claimed in claim 32, wherein said mounting plate has therethrough circumferentially spaced openings receiving bolts connecting said mounting plate to said plunger.

40. An assembly as claimed in claim 32, wherein said mounting plate is formed of light metal or synthetic material.

41. A mounting plate to be used for mounting an air spring in a detachable and variable manner to a radius arm in a vehicle suspension system, said mounting plate comprising:

- structure located centrally of said mounting plate to mount said mounting plate on the radius arm; and
- structure separate from said centrally located structure to connect said mounting plate to a plunger of the air spring.

42. A mounting plate as claimed in claim 41, wherein said centrally located structure comprises a center opening to receive a bolt extended from the radius arm.

43. A mounting plate as claimed in claim 42, wherein said center opening is formed in a central projection of said mounting plate.

44. A mounting plate as claimed in claim 43, further comprising stiffening webs extending radially from said central projection.

45. A mounting plate as claimed in claim 42, wherein said center opening has inner threads to mesh with threads of the bolt.

46. A mounting plate as claimed in claim 41, wherein said separate structure comprises a plurality of circumferentially spaced openings extending through said mounting plate at positions radially outwardly of said centrally located structure.

47. A mounting plate as claimed in claim 41, wherein said mounting plate is formed of light metal or synthetic material.

* * * * *